Patented Dec. 5, 1933

1,938,322

UNITED STATES PATENT OFFICE

1,938,322

PROCESS FOR BREAKING PETROLEUM EMULSIONS

Melvin De Groote, St. Louis, Mo., and Louis T. Monson, Los Angeles, Calif., assignors to Tretolite Company, Webster Groves, Mo., a corporation of Missouri No Drawing. Application October 5, 1931
Serial No. 567,133

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular composition hereinafter described, thereby causing the emulsion to break down and separate into its component parts of oil and water or brine, when the emulsion is permitted to remain in a quiescent state after such treatment.

The treating agent or demulsifying agent contemplated by our process consists of an acidic sulfur-containing derivative of an alcohol having twelve carbon atoms and not more than 26 carbon atoms in the molecule, or the alcohol itself, or a mixture of the two in any proportion, the term "acidic sulfur-containing derivative" being herein used to mean and include the sulfonic acids and acidic sulfuric acid esters of the alcohol. Possibly, sulfur-containing derivatives of an alcohol may be obtained which are similar to mercaptans, and not similar to sulfuric acid esters or sulfonic acids. Such materials are not contemplated for use as a reagent in the present process. Thus, sulfuric acid esters and sulfonic acids represent an acidiform, sulfur-containing derivative, i. e., the sulfur is present as part of a radical which is normally an acid radical, to wit, a sulfonic acid radical, or a sulfuric acid ester radical. The acidiform, sulfur-containing derivatives of the alcohols may be used in the acid state, or after neutralization. In many cases the properties of the acidic sulfuric acid esters and of the true sulfonic acids of the alcohols in question are similar, and in describing our invention we make no distinction between the two kinds of acidic sulfur-containing derivatives, although structurally there is a difference, inasmuch as the acidic sulfur-containing group is bound to the organic residue through oxygen in the acidic sulfuric acid ester compounds, and through the sulfur atoms in the true sulfonic acids. The term just referred to should not be interpreted or construed as being restricted to such bodies in their acidic state, for in preparing our improved treating agent we prefer to use acidic sulfur-containing derivatives in a more or less completely neutralized state, inasmuch as such materials are strong acids and as such have a marked corrosive action on metals.

In preparing or manufacturing our improved treating agent, such alcohols as octadecyl, $C_{18}H_{37}OH$; ceryl alcohol, $C_{26}H_{53}OH$; cetyl alcohol, $C_{16}H_{33}OH$; and other saturated or unsaturated alcohols may be used, and sulfuric acid of any convenient strength may be employed to act on the alcohol as such, or in the form of any of its compounds, such as the waxes. By such procedure there are produced acidic sulfuric acid esters of the respective alcohols, such as, for example, $C_{18}H_{37}SO_4H$ from octadecyl alcohol, and $C_{16}H_{33}SO_4H$ from cetyl alcohol. Likewise, instead of acidic sulfuric acid esters, true sulfonic acids may be prepared from the alcohols. For example, cetyl alcohol gives cetyl sulfonic acid, $C_{16}H_{33}SO_3H$, which compound has been known for at least twenty years. It may be prepared as originally prepared, by Reychler, by conversion of the alcohol successively into the iodide, the mercaptan, and the sulfonic acid, or in any other suitable manner. We prefer to produce the acidic sulfuric acid esters by means of the action of sulfuric acid of 66° Baumé, or of fuming sulfuric acid on the free alcohol. In case small yields are sufficient, a wax containing the alcohol may be subjected to the action of sulfuric acid, whereupon a splitting action takes place, some free alcohol is produced, and this then forms the required sulfuric acid ester.

One procedure that we have found to be highly satisfactory for manufacturing or obtaining the treating agent contemplated by our process is to saponify spermaceti with alcoholic potassium hydroxide; to extract the cetyl alcohol so produced with petroleum ether; and to mix with such cetyl alcohol 35% by weight of 66° sulfuric acid, maintaining a temperature of about 35° C. This temperature is not to be understood as optimum, but has merely been found to be suitable, and other temperatures may be employed. The mass is then washed with water, the acidic aqueous layer is withdrawn, and the layer of cetyl alcohol and cetyl sulfuric acid is neutralized with ammonia. All of the cetyl alcohol does not become transformed into the acid sulfate by the action of sulfuric acid, so that the reaction mass consists of a mixture of the parent alcohol and the acid sulfate. We prefer to use it in this form. In producing our treating agent it is not essential that the product of the reaction be a compound containing the sulfonic or SO₃H group, and where we herein refer to a "sulfonated" material, we mean simply a material produced or obtained by a chemical reaction in which sulfuric acid is employed.

As previously stated, such sulfonated material or materials can be employed in the acid state to constitute the treating agent used in our process, but because of its corrosive nature, we prefer to partially or wholly neutralize said sulfonated material prior to using the same to treat the emulsion. The neutralized sulfonated material can be introduced into the emulsion in an undiluted form, or it may be dissolved in water or in oil prior to using the same to treat the emulsion. Some of the mixtures of alcohols and derivatives are easily dispersible in oil, while others, containing large proportions of the acidic sulfuric acid esters, are more readily dispersible in water and dissolve or disperse in oil only with difficulty. Accordingly, we wish it to be understood that our process contemplates the use of a treating agent that is either water soluble, oil soluble, or oil soluble and water soluble.

In practising our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kinds known as "tank bottoms" and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results. In general, we have found that for an average petroleum emulsion, a ratio of 1 part of treating agent to 5000 parts of emulsion will usually be found to produce commercially satisfactory results.

Having thus described our invention, what we claim and desire to secure by Letters Patent is:

1. A process for breaking petroleum emulsions of the water-in-oil type, which consists in subjecting the emulsion to the action of a demulsifying agent containing an acidiform, sulfur-containing derivative of an alcohol having not less than 12 carbon atoms and not more than 26 carbon atoms in the molecule, and further characterized by being selected from the class comprising sulfonic acids and sulfuric acid esters.

2. A process for breaking petroleum emulsions of water-in-oil type, which consists in subjecting the emulsion to the action of a demulsifying agent containing the sulfuric acid ester of an alcohol having more than 12 carbon atoms and not more than 26 carbon atoms in the molecule, as described.

3. A process for breaking petroleum emulsions of the water-in-oil type, which consists in subjecting the emulsion to the action of a demulsifying agent containing the ammonium salt of the sulfuric acid ester of an alcohol having more than 12 carbon atoms and not more than 26 carbon atoms in the molecule, as described.

4. A process for breaking petroleum emulsions of the water-in-oil type, which consists in subjecting the emulsion to the action of a demulsifying agent containing a sulfonic acid derived from an alcohol having more than 12 carbon atoms and not more than 26 carbon atoms in the molecule, as described.

5. A process for breaking petroleum emulsions of the water-in-oil type, which consists in subjecting the emulsion to the action of a demulsifying agent containing the ammonium salt of a sulfonic acid derived from an alcohol having more than 12 carbon atoms and not more than 26 carbon atoms in the molecule, as described.

6. A process for breaking petroleum emulsions of the water-in-oil type, which consists in subjecting the emulsion to the action of a demulsifying agent containing the sulfuric acid ester of cetyl alcohol.

7. A process for breaking petroleum emulsions of the water-in-oil type, which consists in subjecting the emulsion to the action of a demulsifying agent containing the ammonium salt of the sulfuric acid ester of cetyl alcohol.

MELVIN DE GROOTE.
LOUIS T. MONSON.